Patented June 28, 1927.

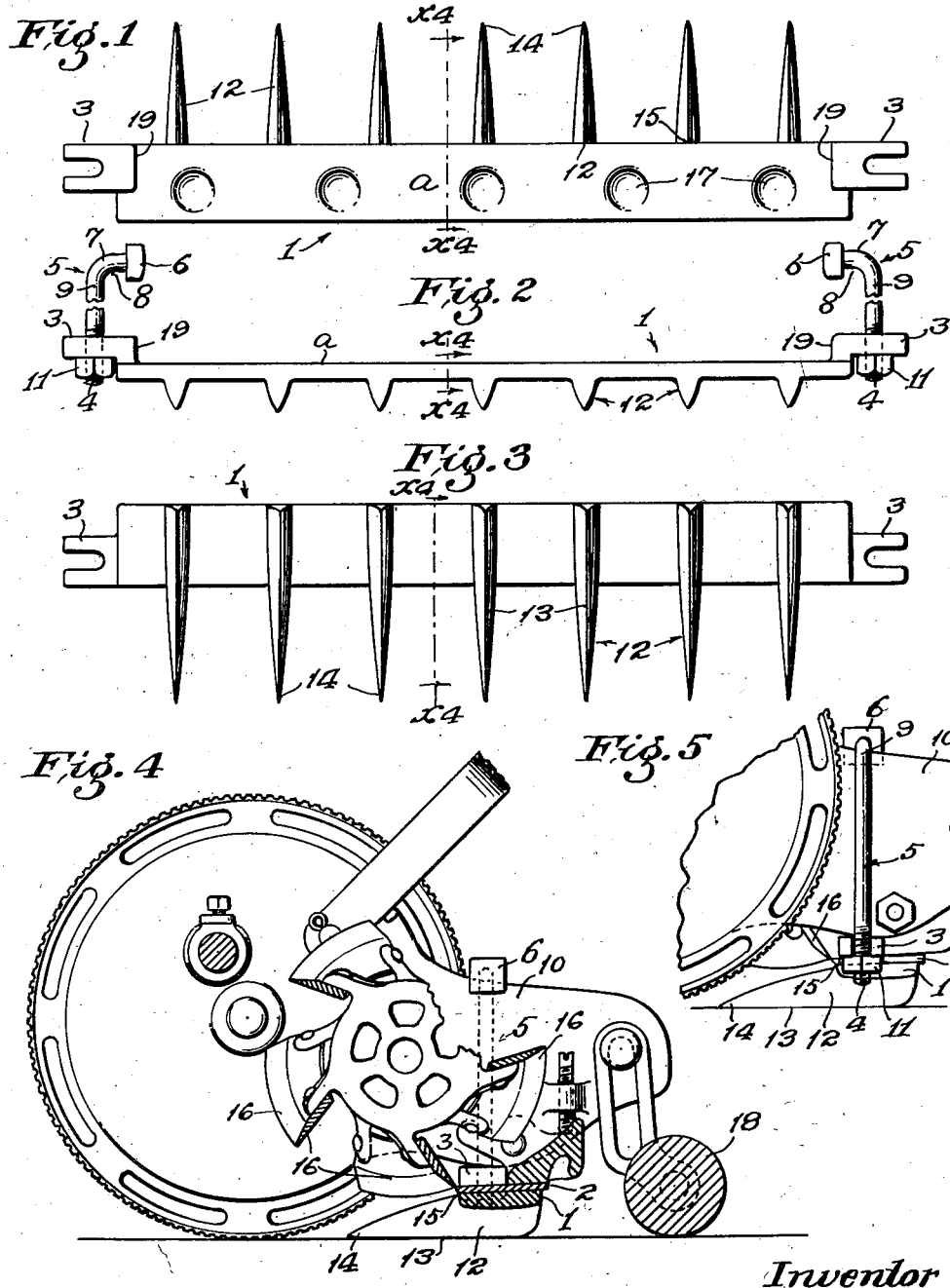

1,633,802

UNITED STATES PATENT OFFICE.

EDWARD S. WRIGHT, OF GLENDALE, CALIFORNIA.

RAKE ATTACHMENT FOR LAWN MOWERS.

Application filed September 26, 1925. Serial No. 58,760.

This invention relates to an attachment for lawn mowers with a view to break up the running vines of Bermuda grass and the like in the operation of cutting lawns; and an object of the invention is to provide a simple, strong, cheap. and effective device and connections therefor, whereby the lawn mower in common use can be quickly fitted for handling the Bermuda grass and vine formations in lawns, and which can be as quickly removed and stored away when the lawn mower is to be used on lawns not infested with such obstructions.

In carrying out the invention I provide a bar adapted on its upper face to fit against the under side of the regular cutter bar of a lawn mower, and provided with fingers to run on the ground and pick up the vine like growth, and I provide said bar at the ends, with slotted lugs; and I provide hook bolts threaded at their lower ends and adapted to have their threaded straight ends inserted through the slots and their upper hook ends to be caught over the frame of the lawn mower and clamped thereon by tightening the nuts under the lugs.

Other objects, advantages and features of invention may appear from the accompanying drawing, the subjoined detailed description and the appended claims.

The accompanying drawing illustrates the invention.

Figure 1 is a top plan view of the attachment bar detached.

Fig. 2 is a rear elevation or edge view of the same with fragments of the attaching bolts.

Fig. 3 is an inverted view, showing the underside or the face opposite to that shown in Fig. 1.

Fig. 4 is a cross section of the attachment and of a lawn mower equipped therewith and fragmentally shown; line $x^4$, Figs. 1, 2 and 3 indicate the plane of section.

Fig. 5 is an end view looking from the left in Fig. 2, and showing a fragment of a lawn mower to which the attachment is attached.

The attachment bar 1 is adapted on its upper face $a$ to fit against the underside of the cutter bar 2 of the lawn mower and is provided at its end with slotted lugs 3 to receive the threaded ends 4 of carriage bolts 5, the headed ends 6 of which are bent substantially at right angles to form at such headed ends of the bolts, hooks 7.

The space 8 between the head 6 and the stem 9 of the bolt is adapted to receive the portion of the frame 10 of the lawn mower, so that when the nuts 11 are tightened against the underside of the lugs 3 and the attachment bar 1 is in place under the cutter bar 2, the attachment bar will be firmly clamped against the cutter bar.

The attachment bar 1 is provided on its underface with runners 12 having bodies that are triangular in cross section and that are provided with straight horizontal edges 13, which extend in front of the attachment bar 1 and are tapered to points 14; the taper being produced from the upper surface and front edge of the attachment bar as at 15 in Figs. 1, 4 and 5.

The blades 16 of the lawn mower are in the same relation to the cutter bar 2 as is common in lawn mowers and for the purpose of accommodating the attachment bar 1, to cutter bars having bolt heads on the underside, the attachment bar may be provided with sockets 17.

In practical use the well known mower is operated in the customary manner and the sharp edges of the runners may groove the ground to bring the tips of the front extensions below the level of the grass runners so that all of the runners will be lifted and carried up to position in front of the cutter 2 where they will be severed by the edges of the blades 16 and be by such blade thrown back in the usual manner.

By adjusting the roller 18, the position of the lower edges 13 relative to the surface of the ground can be regulated to make the runners slightly groove or to just skim the top of the ground.

The slotted lugs 3 are raised above the top face of the attachment bar and form angular shoulders 19 to abut the ends of the cutter bar to hold the attachment bar against slipping endwise, and this allows the attachment to be so attached as to allow the cut grass to clear the cutter blade.

It is thus seen that I have provided for lawn mowers an independent rake attachment which can be sold separately of the lawn mowers and which can be carried in stock and sold either with new lawn mowers or to the owners of lawn mowers; and that to fit the rake to a lawn mover it is only necessary to apply the attachment to the under side of the cutter bar of the lawn mower, apply the hook bolts with the hooks brought into position above the portions of the frame to which they are to be attached, insert the threaded ends of the bolts through the slots, apply the nuts and tighten; and a reversal of the operation quickly removes the rake attachment from the lawn mower.

I claim.

1. An attachment for lawn mowers set forth comprising an attachment bar having runners on its under face and adapted on its upper face to fit against the under side of the cutter bar of a lawn mower and provided at its ends with slotted lugs; bolts bent at the upper ends to form hooks to hook over the frame of the lawn mower and having the lower end portions threaded and adapted to enter the slots of the lugs; and nuts screwed onto the lower ends of the bolts to tighten the bar against the under side of the lawn mower cutter bar.

2. An attachment for lawn mowers set forth comprising an attachment bar having runners on its under face and adapted on its upper face to fit against the under side of the cutter bar of a lawn mower and provided at its ends with slotted lugs raised above the top face of the attachment bar and forming shoulders to abut against the ends of the cutter bar of the lawn mower to hold the attachment bar against slipping endwise and bolts bent at their upper ends to hook over portions of the frame of the lawn mower, the lower ends of said bolts extended through the slots and nuts tightened against the under side of the lugs to hold the attachment bar against the under side of the cutter bar.

In testimony whereof, I have hereunto set my hand at Los Angeles, California, this 19th day of September, 1925.

EDWARD S. WRIGHT.